(No Model.)
H. A. THOMASSON.
NUT LOCK.
No. 603,347. Patented May 3, 1898.
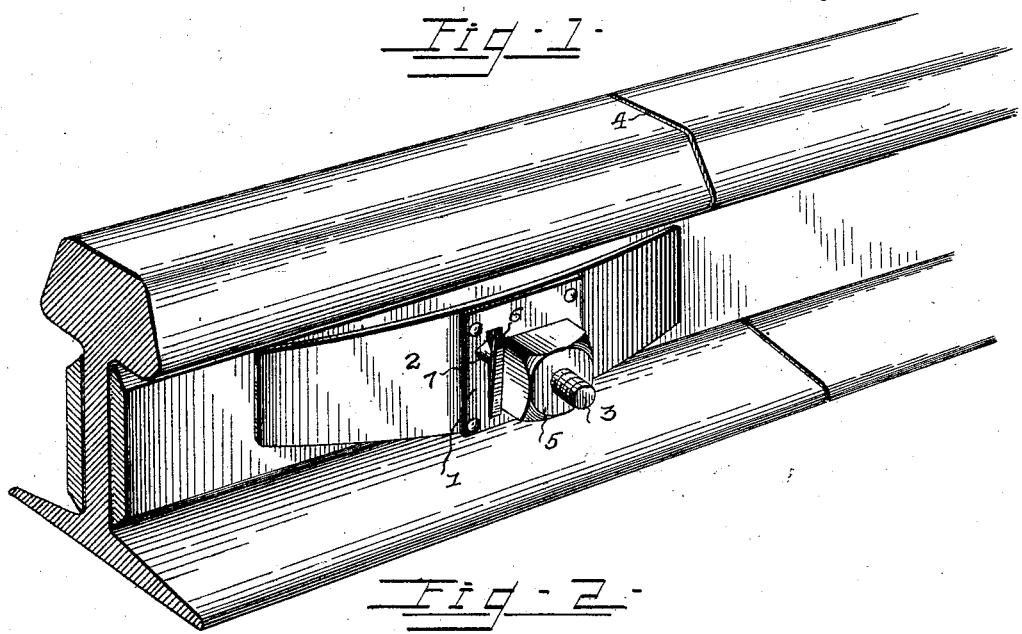
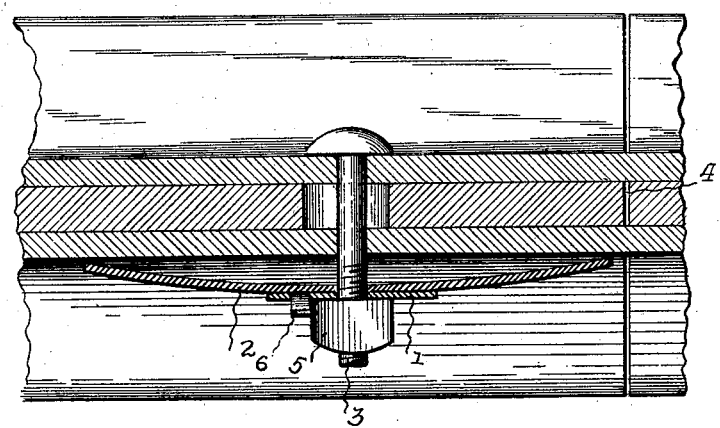
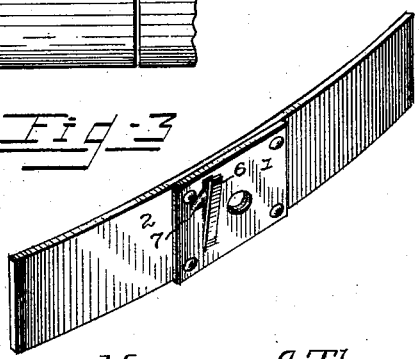
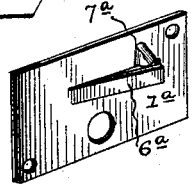
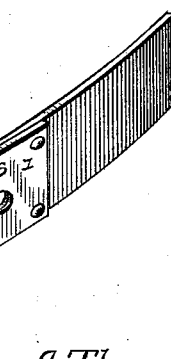
Witnesses
C. J. Young.
H. J. Riley.
Henry A. Thomasson,
Inventor:-
By his Attorneys.
C. A. Snow & Co.

UNITED STATES PATENT OFFICE.

HENRY A. THOMASSON, OF MOUNT HOPE, WEST VIRGINIA, ASSIGNOR OF ONE-HALF TO W. A. SNYDER, OF SAME PLACE.

NUT-LOCK.

SPECIFICATION forming part of Letters Patent No. 603,347, dated May 3, 1898.

Application filed February 28, 1898. Serial No. 672,048. (No model.)

*To all whom it may concern:*

Be it known that I, HENRY A. THOMASSON, a citizen of the United States, residing at Mount Hope, in the county of Fayette and State of West Virginia, have invented a new and useful Nut-Lock, of which the following is a specification.

The invention relates to improvements in nut-locks.

The object of the present invention is to improve the construction of nut-locks and to provide a simple, inexpensive, and efficient device adapted to be readily applied to bolts and nuts without altering the construction thereof and capable of permitting a nut to be readily rotated in the direction for screwing it on a bolt and of absolutely preventing it from accidentally unscrewing.

A further object of the invention is to provide a device especially adapted for locking-nuts of rail-joints and capable of taking up the slack of the parts due to wear and of holding the nut and the parts tight at all times.

Another object of the invention is to enable the nut to be readily removed when desired without injuring the locking device.

The invention consists in the construction and novel combination and arrangement of parts, as hereinafter fully described, illustrated in the accompanying drawings, and pointed out in the claims hereto appended.

In the drawings, Figure 1 is a perspective view of a nut-lock constructed in accordance with this invention and shown applied to a rail-joint. Fig. 2 is a horizontal sectional view of the same. Fig. 3 is a detail perspective view of the bowed spring and the spring-plate. Fig. 4 is a similar view of the spring-plate, showing the same constructed for use independent of the bowed spring. Fig. 5 is a detail sectional view taken horizontally of the spring-plate or washer.

Like numerals of reference designate corresponding parts in all the figures of the drawings.

1 designates a plate constructed of spring metal and mounted on a bowed spring 2, to which it is secured by rivets or other suitable fastening devices, and the plate 1 and the bowed spring 2 are provided with registering openings to receive a bolt 3 of a rail-joint 4. The bowed spring which is interposed between the nut 5 of the bolt and the adjacent fish-plate is adapted to take up the wear of the parts and hold them tight at all times, and the degree of curvature of the spring 1 will readily indicate the extent of the wear of the parts.

The spring-plate 1, which is constructed of spring-steel or other suitable material, is provided with an integral locking-spring 6, formed by slitting the metal, as shown, and the locking-spring 6, which is arranged parallel with one of the side edges of the plate 1, is located at one side of the bolt-opening and is adapted to engage one of the faces of the nut.

The spring-plate 1 is preferably rectangular, but the bolt may be provided with a nut of other shape than that shown, and the spring-plate 1 may be of any other configuration, if desired. The locking-spring, which extends outward at an angle to the face of the plate, is adapted to permit the nut to be screwed inward on the bolt, and it is arranged to be engaged by the side faces of the nut, whereby the latter is prevented from unscrewing.

In order to enable the spring 6 to be readily depressed when it is desired to remove the nut, the spring-plate 1 is provided with a raised or projecting portion 7, located at the free end of the locking-spring and formed by bending the plate outward from its inner face and providing a socket to receive the point of a tool, whereby the same is fulcrumed on the spring-plate. By this construction the locking-spring may be held down flush with the outer face of the plate 1, so that the nut may be readily rotated over it.

In Fig. 4 of the accompanying drawings is illustrated a spring-plate 1ª, constructed similar to that before described, but designed to be used without the bowed spring. The plate 1ª is provided with a locking-tongue 6ª and it has a protuberance 7ª at the free end thereof.

The invention has the following advantages: The nut-lock is exceedingly simple and inexpensive in construction. It is adapted to be applied to bolts and nuts without necessitating any alteration in the construction thereof, and it is capable of automatic action to permit a nut to be screwed on a bolt and will absolutely prevent it from accidentally unscrewing. The spring-plate is provided with a socket arranged adjacent to the free end of the locking-spring and adapted to receive a suitable tool for holding the spring flush with the outer face of the plate, so that a nut may be readily unscrewed when desired.

Changes in the form, proportion, and minor details of construction may be resorted to without departing from the spirit or sacrificing any of the advantages of this invention.

What I claim is—

1. A nut-lock comprising a spring-plate provided with a locking-spring for engaging the nut, and having, adjacent to the free end of the spring, a socket adapted to receive the engaging end of the tool and formed by upsetting or bending the plate outward, substantially as and for the purpose described.

2. A nut-lock constructed of resilient material and consisting of a plate provided between its edges with an integral locking-tongue formed by splitting the plate, the latter being upset or bent outward at the outer side of the free end of the spring to form a socket to receive a tool, whereby the spring may be readily held in a depressed position, substantially as described.

In testimony that I claim the foregoing as my own I have hereto affixed my signature in the presence of two witnesses.

HENRY A. THOMASSON.

Witnesses:
P. M. SNYDER,
R. H. DICKINSON.